United States Patent
Kirtley et al.

(10) Patent No.: US 8,462,639 B2
(45) Date of Patent: *Jun. 11, 2013

(54) SYSTEM AND METHOD FOR TESTING AUTOMATED PROVISIONING AND MAINTENANCE OF OPERATIONS SUPPORT SYSTEMS

(75) Inventors: Rance A. Kirtley, Woodstock, GA (US); Lili Zhang, Colonia, NJ (US)

(73) Assignee: AT&T Intellectual Property II, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/468,469

(22) Filed: May 10, 2012

(65) Prior Publication Data

US 2012/0218902 A1 Aug. 30, 2012

Related U.S. Application Data (63) Continuation of application No. 11/954,048, filed on Dec. 11, 2007, now Pat. No. 8,199,656, which is a continuation of application No. 10/792,371, filed on Mar. 3, 2004, now Pat. No. 7,330,722.

(51) Int. Cl.
*H04J 1/16* (2006.01)

(52) U.S. Cl.
USPC .......................................... 370/241; 370/252

(58) Field of Classification Search
USPC .............. 370/252, 254, 352, 241, 395.5, 400, 370/401, 409; 709/3, 220, 223, 315, 318, 709/203; 379/230, 220, 221, 279, 219; 707/103
See application file for complete search history.

(56) References Cited

U.S. PATENT DOCUMENTS

| | | | |
|---|---|---|---|
| 5,420,917 A | 5/1995 | Guzman | |
| 6,363,421 B2 | 3/2002 | Barker et al. | |
| 6,611,867 B1 | 8/2003 | Bowman-Amuah | |
| 6,678,355 B2* | 1/2004 | Eringis et al. | 379/22 |
| 6,718,377 B1* | 4/2004 | Bischoff et al. | 709/223 |
| 6,738,758 B1 | 5/2004 | Li et al. | |
| 6,963,542 B2 | 11/2005 | Manthoulis et al. | |
| 7,143,152 B1 | 11/2006 | Elman et al. | |
| 7,206,825 B1 | 4/2007 | Sauriol et al. | |
| 7,349,344 B1* | 3/2008 | Hogg | 370/241 |
| 7,522,539 B2* | 4/2009 | Nagasawa | 370/254 |
| 2001/0003833 A1 | 6/2001 | Tomizawa et al. | |
| 2002/0136222 A1 | 9/2002 | Robohm | |
| 2003/0074246 A1 | 4/2003 | Adams et al. | |
| 2003/0108177 A1 | 6/2003 | Hsieh et al. | |
| 2003/0131054 A1 | 7/2003 | Sohn | |
| 2004/0019673 A1* | 1/2004 | Miyazaki et al. | 709/223 |
| 2004/0107277 A1* | 6/2004 | Levesque et al. | 709/223 |
| 2004/0111513 A1 | 6/2004 | Shen | |
| 2004/0153533 A1 | 8/2004 | Lewis | |
| 2004/0266442 A1 | 12/2004 | Flanagan et al. | |
| 2005/0114692 A1* | 5/2005 | Watson-Luke et al. | 713/200 |
| 2005/0254421 A1* | 11/2005 | Galou et al. | 370/230 |

(Continued)

*Primary Examiner* — Abdullah Riyami
(74) *Attorney, Agent, or Firm* — Hoffmann & Baron, LLP (57) ABSTRACT

The present invention provides a complete virtual multi-vendor EMS based network that behaves identical to the network elements of the EMS clients. A virtual network simulator is built that has the ability to faithfully simulate the behavior of any vendor's EMS to represent the data objects required by the TMF 814 specification. This allows automatic provisioning and maintenance of the Operation Support Systems to fully test new functionality against complete EMS based network without depending upon the availability of any physical equipment, thereby providing much quicker, low cost, extremely life-like testing environment.

16 Claims, 5 Drawing Sheets

Object Hierarchy

U.S. PATENT DOCUMENTS

| | | |
|---|---|---|
| 2006/0242289 A1 | 10/2006 | Miller et al. |
| 2007/0008958 A1* | 1/2007 | Clemm et al. ............... 370/352 |
| 2007/0027738 A1 | 2/2007 | Masuda et al. |
| 2007/0121850 A1 | 5/2007 | Klos et al. |
| 2008/0112379 A1 | 5/2008 | Lou et al. |
| 2009/0248646 A1 | 10/2009 | Probst et al. |

* cited by examiner

SYSTEM AND METHOD FOR TESTING AUTOMATED PROVISIONING AND MAINTENANCE OF OPERATIONS SUPPORT SYSTEMS

CROSS REFERENCE TO RELATED APPLICATIONS

This application is a continuation of application Ser. No. 11/954,048, filed Dec. 7, 2011, which is a continuation of application Ser. No. 10/792,371, filed Mar. 3, 2004, which are incorporated herein by reference in their entireties for all purposes.

FIELD OF THE INVENTION

The present invention generally relates to network management systems and more particularly to construction and simulation of behavior of complex networks of network elements of the network management systems.

BACKGROUND OF THE INVENTION

A Network Management System (NMS) provides two important services to the Operations Support Systems (OSS) that comprises any known EMS based network. One typical example is the AT&T Competitive Network Initiative (CNI) project support systems complex. The first is to maintain a complete, up-to-date network inventory and status of all installed CNI Element Management Systems (EMS) equipment and their subtending Network Elements (NE). This inventory is updated in real-time via asynchronous notifications from the EMSs or can be updated synchronously through queries invoked using remote procedure calls to the EMS. The second service that NMS provides is to act as a single point of interface through which the CNI OSSs communicate with the EMSs for service related requests. This allows an OSS to request end-to-end EMS based network connections and to receive inventory and change of status related asynchronous notifications as a result of those requests.

Due to the complexity of the interactions between the NMS, other OSSs and the EMSs in normal operation, it has been necessary to do much of the system testing and all of the integration testing for each release in the laboratory test environment using their small, but complete, network of vendor supplied EMSs and OSS platforms. Normally, it is required to execute a complete set of functionality and interoperability testing with all of the latest software releases running on servers identical to those targeted to be installed in the field, but this type of configuration requires many pieces of equipment to test elements, so it is expensive and time consuming with several testing groups competing for an extremely scarce resource. Additionally, constant changes to the network configuration make it impossible to build sets of repeatable tests, such as those needed for regression testing and make interpretation of test results more difficult.

All of the telecommunications providers who are deploying modern EMS based networks face the same problem of being unable to thoroughly test network management systems due to the unavailability of realistic network test setups due to cost, complexity, short delivery schedules, etc.

In order to address these problems, a set of EMS simulators is constructed using data extracted from EMS equipment running the software version intended to be deployed to the field. In effect, a virtual model of a complete EMS test network is built which is capable of faithfully reproducing all of the functionality provided by EMS systems for complete integration testing and capable of being further modified to add any functionality required up to a complete simulation of any number of EMSs including interconnectivity.

SUMMARY OF THE INVENTION

The present invention provides a method for simulating behavior of network elements of one or more EMS client in a telecommunications network having a plurality of network elements. The method includes receiving from at least one operating support system a request related to network elements, creating a data set of detailed data descriptions based on the request for each of the intelligent network elements using a data store and dynamic provisioning logic in the software, and transmitting the resulting data set to the operating support system. If any of the EMS managed entities are created/deleted or change state, an asynchronous notification will be sent reflecting the creation/deletion or change.

DETAILED DESCRIPTION

The present invention provides a complete virtual multi-vendor EMS based network that behaves identically to the real thing to allow testing of correct functioning of operation support systems. A virtual network simulator is built that has the ability to faithfully simulate the behavior of any vendor's EMS and is built using the JAVA programming language using XML to represent the data objects required by the TMF 814 specification.

Figure 1:
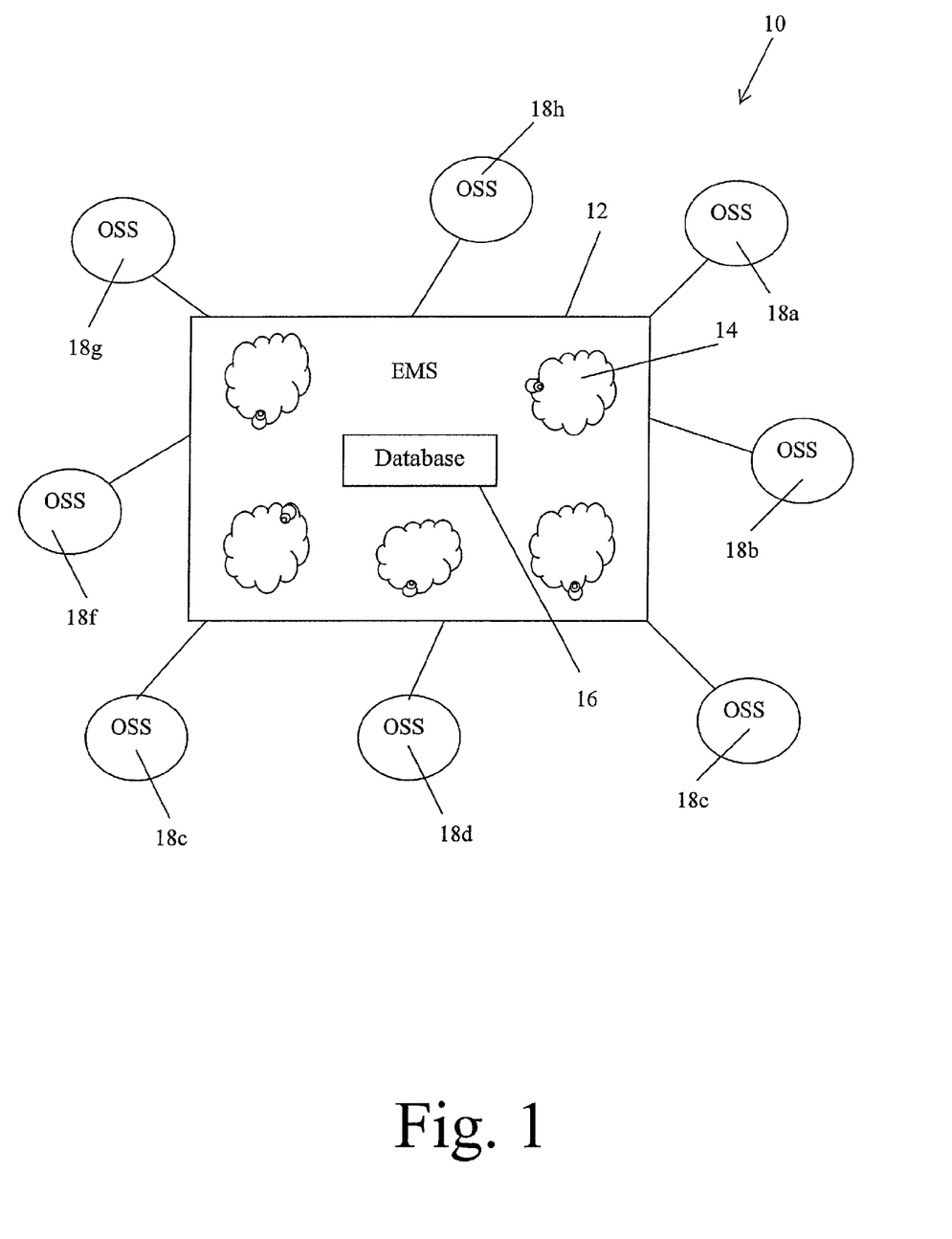
FIG. 1 illustrates a functional block diagram of a virtual EMS based network according to the present invention.

Referring to FIG. 1, there is shown an example of a virtual EMS based Network 10 which generally includes an EMS System 12 for each of the vendors equipments 14. Some of these EMS vendors 14 include Ciena IOS CISCO MSP, Lucent OMS networks, among others. It also contains a database 16 for each EMS which includes data on every vendor's network element (NE) and its corresponding attributes. The attributes will be discussed in greater detail below. The database 16 is preferably in XML format well known to the one skilled in the art. Also, shown are Operating Support Systems 18*a*, 18*b*, 18*c*, etc. which are applications connected to the EMS 12 in order to manage the NEs in the network 10.

Broadly stated, the EMS 12 receives a request/command to process operations as specified by the TMF 814 specification from one of the OSS 18*a*, 18*b*, 18*c*, etc. via a Common Object Request Broker Architecture (CORBA) server (not shown). CORBA is a platform—independent and language independent programming and execution environment for distributed objects. CORBA is utilized in this architecture to provide inter-process and inter-processor communication between OSS 18 and EMS 12 and is specified as the protocol to be used between EMS 12 and NMS by the TMF 814 specification. The various types of commands or requests issued by the OSS are known in the art and are described in the TMF 814 specifications document. Upon receipt of the request, the EMS 12 searches the XML database 16 for information on that particular NE and its corresponding attributes and processes the request. The request is processed by formatting the information and transmitting the results set to the OSS 18 that sent the request. Furthermore, an asynchronous notification may be transmitted to all the other OSS 18 via the CORBA server depending upon the request.

One of the examples of the request may preferably be sent by OSS 18a which may include "Send me info on the vendor equipment for a specific NE." Immediately upon receipt of such a request, the EMS 12 searches the XML database 16 for that particular NE and its corresponding attributes which, in this case will be equipment and equipment holder. Basically, the equipment and the equipment holder attribute will give information on how the NE is currently equipped; ie a list of racks, shelves and cards within the shelves. Upon retrieving this information from the database 16, the EMS 12 will send this info to the OSS 18 that initiated the request. Based on the equipped state of the NEs, OSS 18a will issue another command to EMS 12 to create a connection for those available NEs. Using the equipped state of the NEs, the OSS 18 will select ports i.e. PTP of the correct rate for use in creating a circuit of the requested rate. A request is formed to obtain the list of in-use CTPs on the targeted PTPs. The EMS 12 gathers this in-use information and sends the results back the OSS 18. Using the CTP in-use information, the OSS 18 selects CTPs to be used for the creation of the SNC (Subnetwork Connection) and sends a request to the EMS 12 to form the SNC using the selected end points.

Figure 2:
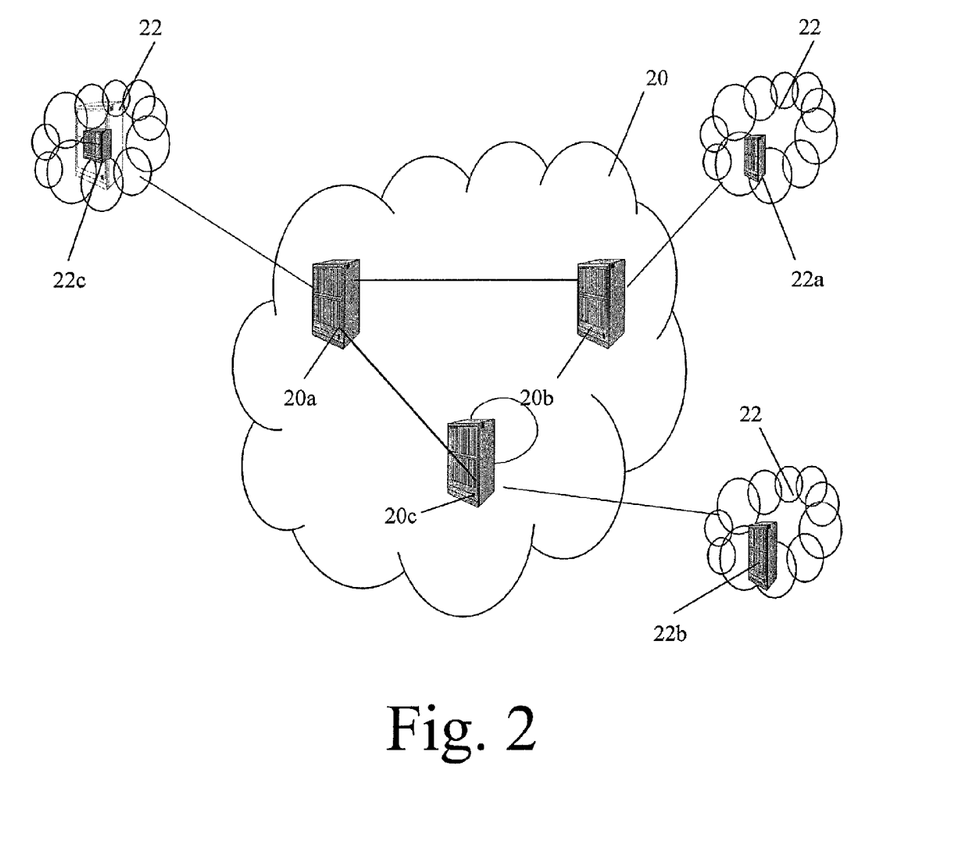
FIG. 2 shows an example of a configuration of a small version of a virtual EMS.

Upon receipt of this command EMS 12 will search the database 14 for those NEs and their corresponding attributes which in this case will be subnetworks. The EMS 12 will create the subnetwork circuit (SNC) (not shown) for those specific NEs. The SNC connects the Input/Output for those Vendors circuit with the specific NEs, which is connecting through the network end to end between the NEs. A good example of a SNC created in an EMS 12 is shown in FIG. 2 as will be discussed in greater detail below. When the SNC is created the EMS 12 will send the information, not only to OSS 18a but to all other OSS 18b, 18c, 18d . . . , that the SNC has been connected. This way all the OSS 18 also know that SNC has been created using those specific NEs and are ready for use to carry customer traffic. Therefore, each of the OSS 18 keeps a local snapshot of the current state of the network, i.e. keeps an updated record of the NEs for each EMS client.

Virtual Network Construction

Referring to FIG. 2, there is shown a configuration of a small version of a virtual EMS 12. As you can see, the Virtual Network 12 consists of one EMS1 vendor subnetwork 20 containing 3 Network Elements NEs 20a, 20b, and 20c and three EMS 2 vendor subnetworks 22 each containing a single NE labeled as 22a, 22b, 22c respectively. Each of NEs of the EMS2 vendor subnetwork 22 and the NEs of the EMS 1 vendor subnetwork 20 are interconnected by high capacity Device Wavelength Division Multiplexing (DWDM) optical transport systems (OTS) which typically are either OC-48 or OC-192 rate facilities. These interconnections between the EMSs 12 normally terminate on predetermined ports on the gateway NEs. Preselecting the NEs and ports assists the OSSs 18 in determining the path from one EMS network 12 to another when SNCs are provisioned.

Specifically each of the NE 20a, 20b and 20c of EMS1 vendor 20 is connected to each other and possibly to NE 22a, 22b and 22c of the EMS2 vendor 22. The EMS2 vendor 22 can preferably be equipment capable of supporting many different types of customer interfaces and so is used to supply a network interface to customers. The EMS 1 vendor 20 can preferably be equipment with high bandwidth and can take very heavy traffic and so is used as the backbone of the EMS based network. Upon request from OSS 18, the EMS 12 as shown in FIG. 2 will create a circuit connection from one EMS2 vendor 22 to another via the EMS1 vendor 20.

All of the data used to create this model of the network 10 in FIG. 2 is based on data extracted from the actual EMSs installed in the laboratory test environment using clients written in tcl command language with combat CORBA extensions. Clients for both the EMS 1 vendor 20 and EMS2 vendor 22 are written to connect to each EMS in the laboratory test environment, extract key data and save it in tcl list form in files. The types of data extracted from each EMS include EMS Management Element, PTP, CTP, Equipment, subnetworks, Routine and Typological links as will be described later with reference to FIG. 3. Next, the raw data is converted into XML using still more tcl and perl scripts. Finally, an interconnection map must be populated with records which describe the facilities used to interconnect the EMS 1 vendor 20 and EMS2 vendor 22. Once all of these steps are complete, the virtual network is ready to be used by the EMS simulators. The detail description of the steps will be described later with reference to FIG. 4.

It is possible to have multiple complete virtual networks. For example, there is a need for an EMEA (Europe, Middle East and Asia) network to support the SDH (Synchronous Digital Hierarchy) In this case, NEs have behavior that differ from SONET (Synchronous Optical Network) due to differences in the type of network they support. It is possible to construct a complete SDH based network using the same methods described above. Each developer or tester may preferably run their own set of simulators with no interference from the other developers. This ability to have multiple individual environments running simultaneously eliminates the constraints imposed by a hardware testbed. Therefore, a full size EMS based networks can be constructed and simulated with zero hardware, thereby, providing much quicker low cost, extremely life-like testing environment for complex networks.

Virtual Network Data and Data Models

Since the EMS based network 10 can be modified to suit the needs of the users, the data is stored in XML files 16 in a directory hierarchy that closely matches the object data model provided by the respective vendor for each EMS type. Also, in-use SNCs, CTPs and timeslots are stored in separate XML files 16 to keep track of the dynamic changes on the original virtual network. Only names are saved in the in-use files as keys to link to the original data. Therefore, the original data model will be kept untouched while providing the necessary persistence support within each virtual network instance. For example, when an SNC is created the CTPs and timeslots associated with the SNC are put into an in-use state. This in-use information is saved in XML representation so that the state information is retained if the simulator must be restarted. This also allows users to manually busy out resources in order to test corner cases such as trying to use a CTP that is already in use. The design also provides the advantage that multiple users can share the same original data model (most of the xml file set) without interfering each other's testing by keeping track of dynamic changes separately, so the same original data model can be expanded or updated transparently to all the users.

Figure 3:
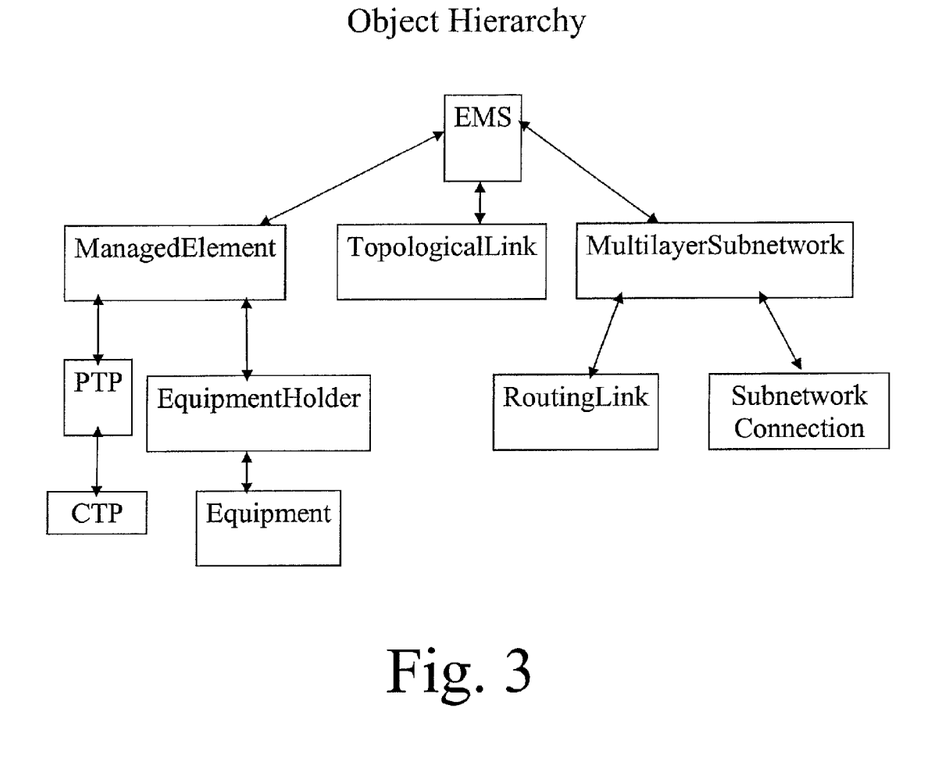
FIG. 3 shows a typical object hierarchy for an EMS utilized in the present invention.

The data models for the virtual networks of the present invention are based on the object models supplied by the EMS vendors, which are in turn based on the object naming hierarchy defined by the TMF. FIG. 3 depicts the 'base' TMF object naming hierarchy of the attributes of the network elements. Some of the attributes managed by the EMS include managed elements, PTP (Physical Termination Point), CTP (Connection Termination Point), equipment, subnetworks, routing links, topological links as shown in FIG. 3. These attributes are well-known in the art and are defined in the TMF 814 specification document. It is to be noted that only some of the attributes are disclosed; however, other attributes defined in the TMF 814 specification can very well be applied in the present invention. For different EMS types, there are small deviations in the object hierarchy. The structure of the data implements the rule that every child object is dependent upon the existence of the parent; e.g., you can't have an Equipment Holder that isn't contained within a Managed Element. Every object in the tree can be uniquely identified and located using its fully qualified name. Arrows in FIG. 3 represent the ability of each object to reference another. Every object can reference it's parent and all siblings. The EMS 1 Vendor 20 and EMS2 Vendor 22 both use a similar directory structure and are each child directories under the same XML 'root' directory which are named EMS 1 vendor 20 and EMS2 vendor 22 respectively. Note that for the EMEA virtual networks the data structures are identical, but the data contents differ due to the use of the Synchronous Digital Hierarchy (SDH) in EMEA, as explained previously.

Figure 4A:
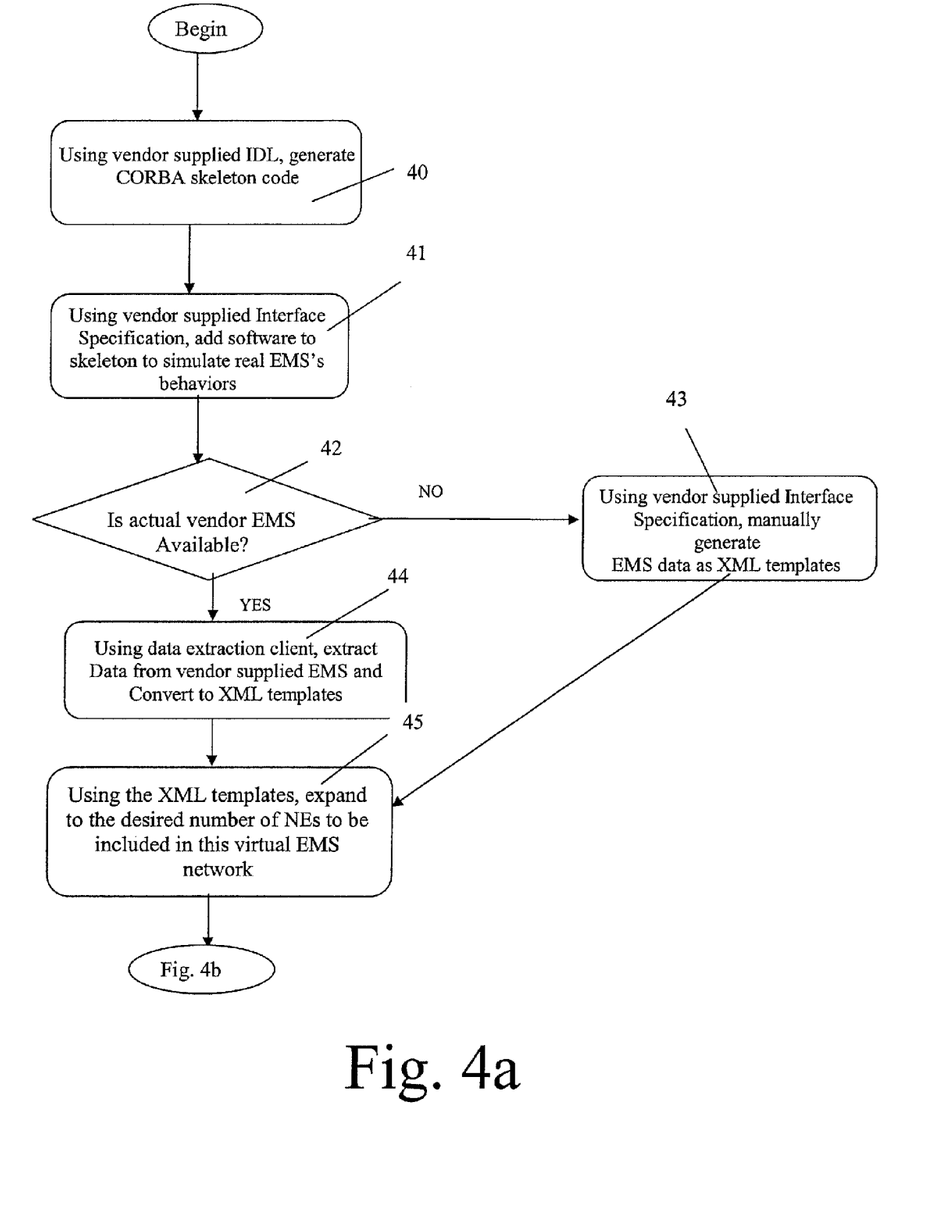
FIGS. 4a-4b show a flow chart for virtual network simulator construction according to the present disclosure.
Figure 4B:
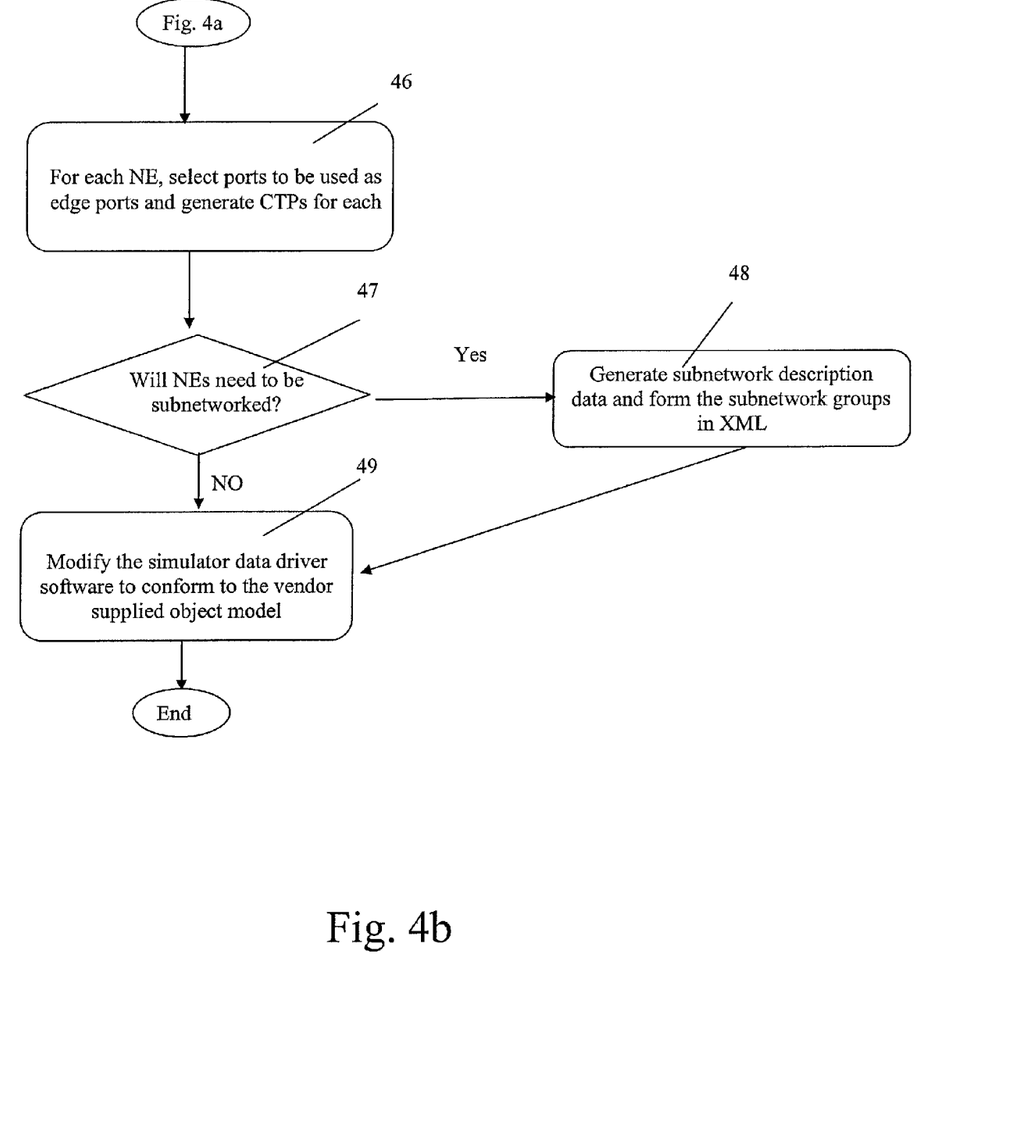

As discussed above, the primary objective of the present invention is that a complete virtual EMS based network can be created with a set of XML input files. The process involves implementing all of the operations required by the TMF 814 specification and a set of XML files which describe the complete object hierarchy associated with an EMS network. Each vendor has its own EMS and an Interface Description Language (IDL), which is the behavior of EMS of the vendor. In, order to construct a complete EMS network certain steps are required. Broadly stated these steps include using the IDL supplied by the vendor, generating an EMS skeleton using the vendor supplied IDL and standard JAVA IDL generating JAVA utilities. An EMS skeleton is a framework of behavior of all EMS. Using the Interface Agreement supplied by the vendor and the intelligent network element descriptions in the XML database, supply implementations for required operations. Based on the forecasted deployment profile detailed data descriptions are created for each managed element under control of the EMS. Once the EMS servers are fully implemented and the data set is complete, the EMS simulator is ready to use. The detail description of these steps is described referring to FIG. 4 herein below.

FIGS. 4a-4b provide a flow chart displaying the steps required for virtual network simulator construction. Using the vendor supplied IDL, a CORBA skeleton code is generated at step 40. All vendors that construct EMS systems to conform to the TMF 814 standard must provide interface specifications in the form of CORBA IDL (Interface Descriptor Language). CORBA IDL is a standard descriptor language as defined by the OMG standards group. Software toolsets designed to develop CORBA applications normally supply an IDL compiler to allow the generation of CORBA skeleton code in various programming languages. In this application, the IDL is compiled preferably into Java skelton code which forms the foundation of the Virtual Network Simulator. The resulting Java code provides support for all defined object types and entry points for all defined remote procedure calls. Then at step 41, using vendor supplied interface specification, software is added to the skeleton.

All vendors that construct EMS systems to conform to the TMF 814 standard must also provide interface specifications in the form of a document which describes in detail all of the objects, object attributes and remote procedure call behavior of the EMS as implemented. Although most objects, object attributes and remote procedure call behavior conform absolutely to the TMF 814 standard, vendor extensions are allowed and are necessary for special custom features added by the vendors. Using this document as a reference, the previously generated Java skeleton code must be modified to add any applicable objects, object attributes and remote procedure call behavior as required. The resulting set of software is now capable of managing all defined objects, object attributes and remote procedure calls as specified, but has no data with which to populate the object attributes.

When constructing an instance of the Virtual Network Simulator, it is ideal to have one instance of the vendor's EMS implemented with the correct version of software available in order to extract examples of the EMS objects for use as templates for the virtual network data generation process. At step 42, it is checked if an actual vendor EMS is available. If an instance of the vendor's EMS is not available, the template data must be constructed manually using existing templates and modifying them according to the vendor provided interface specification document. Therefore, at step 43, all virtual network EMS data is manually generated as XML templates using existing data object templates in conjunction with the vendor supplied interface specification document. Since many of the objects and object attributes are standardized to the TMF 814 specification, it is usually possible to re-use existing data sets with minor modifications as specified in the vendor provided interface specification document. The resulting XML templates will be used to generate a complete set of NEs for the virtual network as will be described in greater detail below. However, in normal circumstances, the actual vendor EMS is always available. In the case, when the vendor supplied EMS is available, then at step 44, using a specialized software client, all of the required objects are extracted from the vendor supplied EMS and converted to XML format for use as templates for generating the complete set of virtual network data. This method is by far the best method for generating the XML templates since the extracted data is in the expected form and contains all expected attributes. This data will allow the truest simulation of the EMS.

Using the XML data templates resulting from either steps 43 or 44, a set of NEs is generated as needed for the simulated virtual EMS network. Normally all of the generated NEs are configured to have nearly identical Equipment and PTP objects. This is normally the case for actual NEs deployed to the field as it makes for ease of maintenance and configuration. The Managed Element file is also modified to contain all of the generated NEs. At this point, the NEs need to become virtually connected to form the virtual network. At step 46, ports are selected to be used as edge ports and generate CTPs for each NE. NEs are connected through edge ports, which are special PTPs designated to be dedicated to NE interconnection. Once again, the PTPs selected typically tend to be identical among sets of NEs deployed to the field as it makes for ease of maintenance and configuration, but is not required. Once the edge port PTPs are selected, CTPs must be generated depending upon the type (rate) of the virtual interconnecting facility. Generally all CTPs possible for a given facility rate are generated for use using data generation scripts.

Depending upon the implementation and functionality of the vendor supplied EMS, it is possible that NEs can be grouped artificially internally by Subnetwork. This capability can allow groups of NEs to behave in concert and is vendor specific functionality. At step 47, it is checked if the NEs need to be subnetworked. If yes, then, at step 48, this capability is simulated and if this subnetwork description data is generated to form the Subnetwork groups. This functionality is optional.

At this point all of the virtual network data has been generated. Since the object model of the vendor supplied EMS can vary in the types of objects supported in their particular implementation, the simulator must be modified to load the expected data into the internal data model. At step 49, the simulator data driver software is modified to conform to the vendor supplied object model. Since many of the objects and object attributes are standardized to the TMF 814 specification, it is usually possible to re-use most of the existing data driver software with minor modifications. Going back to step 47, if it is determined that the NEs do not need to be subnetworked, then go directly to step 49 discussed above.

The design also takes rainy-scenario testing into consideration. Based on the TMF 814 specifications, each object level in the EMS hierarchy can have a set of predefined exceptions in the CORBA IDL. This simulator takes a run-time tunable properties file as input, which users can specify in which CORBA operation and at which object level, the virtual EMS or sub-elements will throw what type of exceptions. With this capability, the users can simulate all kinds of different field network problems and test out how upstream NMS will respond based on different exceptions types.

It will be apparent that the present invention has been described herein with reference to certain preferred or exemplary embodiments. The preferred or exemplary embodiments described herein may be modified, changed, added to, or deviated from without departing from the intent, spirit and scope of the present invention, and it is intended that all such additions, modifications, amendments and/or deviations be included within the scope of the following claims.

GLOSSARY OF ACRONYMS

1. Glossary

IOS—Intelligent Optical Switch (Ciena Core)
MSP—Multiservice Platform (CISCO ONS)
CNI—Competitive Network Initiative
AGN—AT&T Global Network
OSS—Operations Support Systems
EMS—Element Management Systems
INE—Intelligent Network Elements
TMF—Telecommunications Managements Forum
DSL—Digital Services Laboratory
CORBA—Common Object request Broker Architecture
SDH—Synchronous Digital Hierarchy
SONET—Synchronous Optical Network
IDL—Interface Description Language
EMEA—Europe Middle East and Asia

What is claimed is:

1. A computer-readable storage device to store instructions that, when executed by a processing device, cause the processing device to perform operations to provision and maintain an operations support system associated with a telecommunications network, the operations comprising:
   receiving, from the operations support system, a request associated with a virtual network element of an element management system client, the virtual network element simulating behavior of the element management system client;
   creating a virtual subnetwork circuit associated with the virtual network element, the virtual subnetwork circuit including first and second simulated element management system clients, the first and second simulated element management system clients including a set of data descriptions based on the request associated with the virtual network element using a database including attribute information associated with the virtual network element and provisioning logic, the virtual subnetwork circuit connecting the virtual network element between the first and second simulated element management system clients;
   transmitting the set of data descriptions to the operations support system; and
   transmitting an asynchronous notification associated with the set of data descriptions to the operations support system.

2. The computer-readable storage device defined by claim 1, wherein the operations further comprise selecting attribute information from the database based on the request received from the operations support system.

3. The computer-readable medium storage device defined by claim 1, wherein the attribute information includes a managed element, topological link, multilayer subnetwork, physical termination point, connection termination point, equipment holder, equipment routing link, and subnetwork connection.

4. The computer-readable storage device defined by claim 1, wherein the request includes instructions to create a connection to the element management system client.

5. The computer-readable storage device defined by claim 4, wherein the operations further comprise:
   establishing a connection between virtual network elements associated with the element management system client in response to receiving the instructions; and
   transmitting notification of the connection to the operations support system.

6. The computer-readable storage device defined by claim 1, wherein the operations further comprise transmitting the asynchronous notification in response to creation of the virtual network element.

7. The computer-readable storage device defined by claim 1, wherein the operations further comprise transmitting the asynchronous notification in response to deletion of the virtual network element.

8. The computer-readable storage device defined by claim 1, wherein the operations further comprise transmitting the asynchronous notification in response to a change in state of the virtual network element.

9. A system that provisions and maintains an operations support system associated with a telecommunications network, the system comprising:
   a processing device; and
   a computer-readable storage device to store instructions that, when executed by the processing device, cause the processing device to perform operations comprising:
   receiving, from the operations support system, a request associated with a virtual network element of an element management system client, the virtual network element simulating behavior of the element management system client;
   creating a virtual subnetwork circuit associated with the virtual network element, the virtual subnetwork circuit including first and second simulated element management system clients, the first and second simulated element management system clients including a set of data descriptions based on the request associated with the virtual network element using a database including attribute information associated with the virtual network element and provisioning logic, the virtual subnetwork circuit connecting the virtual network element between the first and second simulated element management system clients;

transmitting the set of data descriptions to the operations support system;

transmitting an asynchronous notification associated with the set of data descriptions to the operations support system.

10. The system defined by claim 9, wherein the operations further comprise selecting attribute information from the database based on the request received from the operations support system.

11. The system defined by claim 9, wherein the attribute information includes a managed element, topological link, multilayer subnetwork, physical termination point, connection termination point, equipment holder, equipment routing link, and subnetwork connection.

12. The system defined by claim 9, wherein the request includes instructions to create a connection to the element management system client.

13. The system defined by claim 12, wherein the operations further comprise:

establishing a connection between virtual network elements associated with the element management system client in response to receiving the instructions; and transmitting notification of the connection to the operations support system.

14. The system defined by claim 9, wherein the operations further comprise transmitting the asynchronous notification in response to creation of the virtual network element.

15. The system defined by claim 9, wherein the operations further comprise transmitting the asynchronous notification in response to deletion of the virtual network element.

16. The system defined by claim 9, wherein the operations further comprise transmitting the asynchronous notification in response to a change in state of the virtual network element.

* * * * *